(12) United States Patent
Oglesby et al.

(10) Patent No.: US 6,716,546 B2
(45) Date of Patent: Apr. 6, 2004

(54) SYSTEM AND METHOD FOR SUPPLYING AIR TO A FUEL CELL FOR USE IN A VEHICLE

(75) Inventors: Keith Andrew Oglesby, Livonia, MI (US); Kurt David Osborne, Dearborn, MI (US); Woong-chul Yang, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 532 days.

(21) Appl. No.: 09/849,575

(22) Filed: May 4, 2001

(65) Prior Publication Data

US 2002/0164515 A1 Nov. 7, 2002

(51) Int. Cl.$^7$ .................................................. H01M 8/06
(52) U.S. Cl. ........................................... 429/25; 429/13
(58) Field of Search ............................. 429/13, 17, 20, 429/25

(56) References Cited

U.S. PATENT DOCUMENTS 6,190,791 B1 * 2/2001 Hornburg ..................... 429/17

* cited by examiner

Primary Examiner—Randy Gulakowski
Assistant Examiner—Monique Wills
(74) Attorney, Agent, or Firm—Carlos L. Hanze

(57) ABSTRACT

A system 10 is provided for supplying air to a fuel cell 12 for use within a vehicle 14. The system 10 includes a conventional storage tank 16 which receives and stores hydrogen gas at a relatively high pressure, an expander unit 18, a compressor unit 20, pressure regulators 22, 24, a valve 26, a controller 30, and vehicle sensors 32, and a secondary compressor 34. The system 10 selectively channels pressurized hydrogen gas through expander unit 18 which lowers the pressure of the hydrogen gas and rotatably drives compressor 20. By utilizing the potential energy within the hydrogen gas to drive compressor 20, system 10 conserves energy and improves the overall fuel economy of the vehicle 14.

20 Claims, 1 Drawing Sheet

SYSTEM AND METHOD FOR SUPPLYING AIR TO A FUEL CELL FOR USE IN A VEHICLE

FIELD OF THE INVENTION

This invention relates to a system and a method for supplying air to a fuel cell and more particularly, to a system and method which uses the potential energy stored within hydrogen gas that is supplied to a vehicle's fuel cell to drive a compressor which pressurizes and delivers air to the fuel cell, thereby improving the efficiency and the fuel economy of the vehicle.

BACKGROUND OF THE INVENTION

In order to reduce automotive emissions and the demand for fossil fuel, automotive vehicles have been designed that are powered by electrical devices such as fuel cells. These fuel cell-powered electric vehicles reduce emissions and the demand for conventional fossil fuels by eliminating the internal combustion engine (e.g., in completely electric vehicles) or by operating the engine at only its most efficient/preferred operating points (e.g., in hybrid electric vehicles).

Many fuel cells consume hydrogen gas and air (e.g., as a constituent). The consumed hydrogen and air must be properly stored and transferred to the fuel cell at certain pressures in order to allow the fuel cell and vehicle to operate in an efficient manner.

Vehicles employing these types of fuel cells often include systems and/or assemblies for storing and transmitting hydrogen gas and air to the fuel cell. Particularly, the hydrogen gas is typically stored within a tank at a relatively high pressure and with a relatively high amount of potential energy. The hydrogen gas is then transferred to the fuel cell by use of several conduits and several pressure-reducing regulators which lower the pressure of the gas by a desirable amount. While the pressure of the hydrogen gas leaving the fuel tank is substantially lowered prior to entering the fuel cell, it remains above normal atmospheric pressures which is required for efficient operation. The air that is communicated to the fuel cell is obtained at atmospheric pressures and must be pressurized or otherwise driven through the system in order to ensure proper and efficient fuel cell operation. This pressurization and/or driving of air through the system is typically performed by use of one or more compressors or turbines. These compressors or turbines require electrical energy for their operation, and therefore drain the vehicle's battery and use generated electrical energy, which could otherwise be used to power the vehicle's electrical components and accessories.

There is therefore a need for a new and improved system and method for use with a fuel cell-powered vehicle which utilizes the potential energy stored within the vehicle's hydrogen gas supply to drive an air compressor which supplies air to the fuel cell, thereby reducing the power requirements of the vehicle and improving fuel economy.

SUMMARY OF THE INVENTION

A first non-limiting advantage of the invention is that it provides a system and method for supplying air to a fuel cell which utilizes the potential energy of compressed gas stored within a vehicle to supply pressurized air to the vehicle's fuel cell.

A second non-limiting advantage of the invention is that it efficiently supplies air to a fuel cell by converting the potential energy of stored hydrogen gas into mechanical energy which is used to drive a compressor.

According to a first aspect of the present invention, a system is provided for supplying air to a fuel cell within a vehicle. The system includes a fuel tank which stores pressurized hydrogen gas; a first conduit system which selectively and fluidly couples the fuel tank to the fuel cell, effective to allow the hydrogen gas to be selectively communicated to the fuel cell; an expander which is disposed within the first conduit system and which is selectively and rotatably driven by the pressurized hydrogen gas, effective to lower the pressure of the hydrogen gas which is communicated to the fuel cell; a second conduit system which selectively and fluidly couples the fuel cell to a source of air, effective to allow the air to be selectively communicated to the fuel cell; and a compressor which is disposed within the second conduit system and which is mechanically coupled to and rotatably driven by the expander, the compressor being effective to compress the air which is communicated to the fuel cell.

According to a second aspect of the present invention, a method is provided for delivering pressurized gas and air to a fuel cell. The method includes the steps of: storing the pressurized gas within a container; providing a first conduit system for transferring the pressurized gas from the container to the fuel cell; providing a second conduit system for transferring air to the fuel cell; providing an expander; providing a compressor; operatively disposing the expander within the first conduit system; operatively disposing the compressor within the second conduit system; operatively connecting the expander to the compressor; and channeling the pressurized gas through the expander, effective to rotatably drive the expander and the compressor, thereby reducing the pressure of the gas that is transferred to the fuel cell and increasing the pressure of the air that is transferred to the fuel cell.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
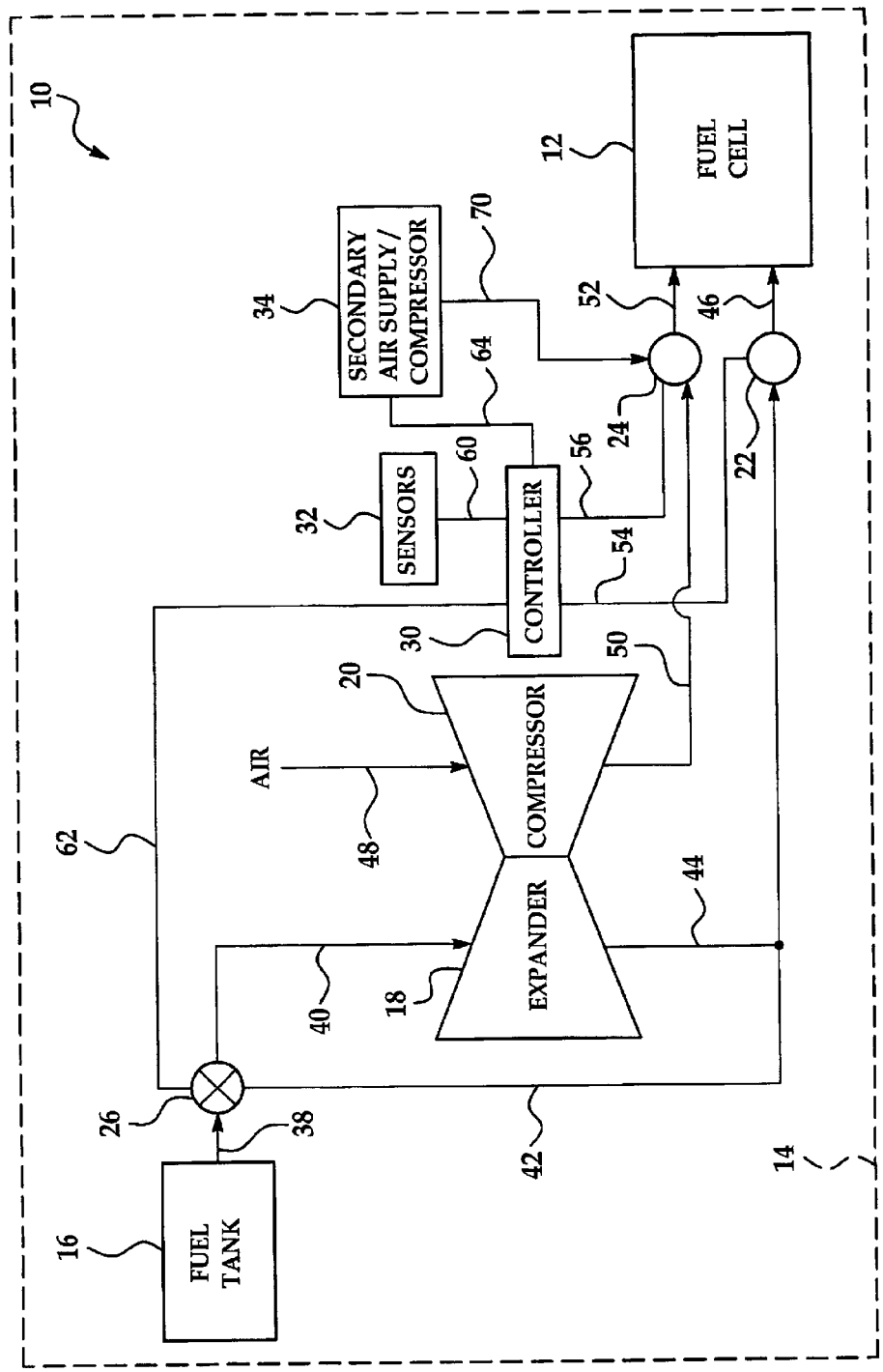
FIG. 1 is a block diagram of a system which is made in accordance with the teachings of the preferred embodiment of the invention, which adapted for use with a fuel cell-powered vehicle and which is effective to selectively supply pressurized air to the fuel cell by utilizing the potential energy stored within hydrogen gas that is used to power the vehicle's fuel cell.

Referring now to FIG. 1, there is shown a block diagram of a system 10, which is made in accordance with the teachings of the preferred embodiment of the invention, and which is effective to supply air to one or more fuel cells 12 within a vehicle 14. Particularly, system 10 is adapted for use in combination with a vehicle 14 including one or more hydrogen-based fuel cells 12 which provide power to the vehicle 14. In the preferred embodiment, vehicle 14 is an electric or a hybrid-electric vehicle. In the preferred embodiment, fuel cells 12 utilize a chemical reaction that consumes hydrogen gas to generate electrical power. It should be appreciated that while in the preferred embodiment of the invention, fuel cells 12 are of the type which consume hydrogen gas, in other alternate embodiments, other types of compressed gasses can be used to generate power within the fuel cell 12, and system 10 would work in a substantially identical manner to recover potential energy stored within those compressed gasses and provide substantially identical benefits.

System 10 includes a conventional storage tank 16 which receives and stores hydrogen gas at a relatively high pressure, an expander unit or assembly 18, a compressor unit or assembly 20 which is operatively coupled to expander unit 18, pressure regulators 22, 24, a valve 26, a controller 30, vehicle sensors 32 and a secondary air supply or compressor 34.

The system 10 further includes a first conduit system including several tubes or conduits disposed throughout the vehicle 14, which selectively carry and transport the hydrogen gas from the tank 16 to the fuel cell 12. Particularly, tank 16 is fluidly coupled to valve 26 by use of conduit 38, and valve 26 is fluidly coupled to expander 18 by use of conduit 40 and to regulator 22 by conduit 42. Expander 18 is fluidly coupled to conduit 42 and to regulator 22 by use of conduit 44, and regulator 22 is fluidly coupled to fuel cell 12 by conduit 46.

A second conduit system fluidly couples fuel cell 12 to a source of air. Particularly, compressor 20 is fluidly coupled to and receives air through conduit 48, and is further fluidly coupled to regulator 24 by use of conduit 50. Regulator 24 is fluidly coupled to fuel cell 12 by use of conduit 52. It should be appreciated that the present invention is not limited to the foregoing conduit systems and/or configurations, and that in alternate embodiments, different and/or additional numbers of conduits may be used to interconnect the various components of system 10. For example and without limitation, vehicle 14 may further include exhaust and/or return conduit systems (not shown) which are effective to treat and/or remove exhaust gasses from the system and/or to return unused hydrogen gas to the fuel cell 12.

Controller 30 is respectively, electrically and communicatively coupled to regulators 22, 24 by use of electrical buses 54, 56, to sensors 32 by use of electrical bus 60, to valve 26 by use of electrical bus 62, and to secondary air supply/compressor 34 by use of bus 64.

In the preferred embodiment, controller 30 is a conventional microprocessor based controller and in one non-limiting embodiment, controller 30 comprises a portion of a conventional engine control unit ("ECU") In other alternate embodiments, controller 30 is externally coupled to the engine control unit.

Tank 16 is a conventional storage tank which is adapted to receive and store compressed gaseous fuel, such as hydrogen gas, at relatively high pressures. In the preferred embodiment, expander 18 includes a turbine which receives and which is rotatably driven by pressurized gas received from tank 16. Expander 18 is operatively and/or mechanically coupled to compressor 20 in a conventional manner (e.g., by use of a shaft (not shown)). In this manner, the rotation of expander 18 rotatably drives compressor 20 in a conventional manner. After the pressurized hydrogen gas passes through expander 18, the gas is communicated to fuel cell 12 by way of conduits 44, 42, 46 and regulator 22.

In the preferred embodiment, compressor 20 includes a conventional turbine and is coupled to and is rotatably driven by expander 18. Compressor 20 is in fluid communication with a source of air. Particularly, compressor 20 is fluidly coupled to conduit 48 which receives air from outside vehicle 14. When rotated, compressor 20 is effective to "draw in" air through conduit 48, to compress or pressurize the air, and to communicate the pressurized air to fuel cell 12 by use of conduits 50, 52 and regulator 24.

In the preferred embodiment, regulators 22, 24 are conventional electronically controlled regulators which respectively control the pressure of the hydrogen gas and air entering into fuel cell 12. Particularly, regulators 22 and 24 receive signals from controller 30 which are effective to control the operation of regulators 22, 24. Controller 30 controls the amount that the regulators 22, 24 decrease (or increase) the pressure of gas and air that enters fuel cell 12 based upon vehicle operating data that is received from conventional vehicle operating sensors 32. In alternate embodiments, regulators 22, 24 are mechanically controlled or set regulators.

Sensors 32 comprise conventional and commercially available vehicle operating sensors which measure and/or estimate various vehicle operating attributes, such as the pressures of the hydrogen gas and air within various locations in the system (i.e., within various conduits), the vehicle speed, the engine speed, the amount of fuel remaining in tank 16, and the pressure of the fuel within tank 16. Sensors 32 measure and/or estimate these attributes and communicate signals representing the measured and/or estimated values to controller 30 which uses the signals to operate regulators 22, 24 and valve 26 in a desired manner.

Valve 26 is a conventional electronically controlled (e.g., solenoid) valve which allows pressurized gas from fuel tank 16 to be selectively communicated to expander 18 through conduit 40 or to be selectively communicated directly to regulator 22 through conduit 42. Valve 26 may also be selectively disposed in a closed position in which no gas is allowed to escape from tank 16 through either of conduits 40 or 42.

In the preferred embodiment, secondary air supply/compressor 34 is a conventional motor-driven compressor or other source of pressurized air. Secondary air supply/compressor 34 is fluidly coupled to regulator 52 by use of conduit 70. In one alternate embodiment, secondary compressor 34 is coupled to fuel cell 12 through a separate pressure-reducing regulator. Secondary compressor 34 is selectively activated and deactivated in response to signals from controller 30. Upon activation, compressor 34 delivers pressurized air to fuel cell 12 through conduits 70 and 52 and regulator 24.

In operation, system 10 utilizes the potential energy stored within the hydrogen gas fuel to mechanically drive compressor 20, thereby supplying pressurized air to fuel cell 12. When the tank 16 is filled, the hydrogen gas within the tank is at a relatively high pressure. When the vehicle 14 is operated, the pressure of the hydrogen gas must be substantially reduced prior to being transferred to fuel cell 12. When the tank 16 is substantially filled, this pressure reduction is performed by channeling the pressurized gas through expander 18 and regulator 22. Particularly, controller 30 sends a signal to valve 26, effective to cause valve 26 to channel the gas through conduit 40. When the pressurized gas flows through expander 18, it is effective to both desirably reduce the pressure of the gas and to rotatably drive expander 18 and compressor 20, which is mechanically coupled to expander 18. In this manner, the potential energy stored within the compressed gas is desirably captured and converted into mechanical energy.

This mechanical energy drives compressor 20, which draws in air received through conduit 48, pressurizes or compresses the air, and desirably delivers the compressed air to fuel cell 12 through conduits 50, 52 and regulator 24.

After the compressed hydrogen gas passes through expander 18, it traverses conduits 44 and 42 and enters regulator 22 which lowers the pressure of the gas to a predetermined and/or calibratable level which is necessary for the optimal performance of fuel cell 12 and which may be determined based upon the attributes of fuel cell 12. In the preferred embodiment, controller 30 selectively alters the amount that pressure-reducing regulator 22 lowers the pressure of the hydrogen gas, based upon vehicle attribute or operation data, and based upon the pressure of the gas after it traverses expander 18, which can be sensed in a conventional manner (e.g., by use of conventional pressure sensors (not shown)).

Controller 30 further controls the operation of pressure regulator 24 which ensures that the pressure of the compressed air entering fuel cell 12 is equal to a predetermined value which is necessary for optimal performance of fuel cell 12.

As the vehicle 14 is driven and the fuel supply is depleted, the pressure of the hydrogen gas within the system decreases and the pressure of the air that is being supplied by compressor 20 correspondingly decreases. Controller 30 monitors the supplied hydrogen and air pressures (e.g., the pressures of the gasses being supplied to regulators 22, 24) by use of sensors 32 and when either the hydrogen or air pressure falls below a certain predetermined and/or calibratable level, controller 30 generates a signal to valve 26 effective to actuate the valve 26, thereby causing the hydrogen gas from tank 16 to bypass expander 18 and to flow directly to regulator 22 through conduit 42. Controller 30 concurrently activates secondary air supply/compressor 34, effective to cause the secondary compressor 34 to provide pressurized air to fuel cell 12.

System 10 performs this function to ensure that the pressures of the hydrogen gas and air entering fuel cell 12 is sufficient for optimal performance of the fuel cell 12. That is, when the pressure of the gas in tank 16 falls below a certain level, the pressure drop over the expander 18 may cause the pressure of the hydrogen gas to fall below a value which is required for optimal performance of the fuel cell 12. Additionally, the reduced ability of the expander 18 to drive compressor 20 may cause the pressure of air supplied by compressor 20 to fall below a certain desired level which is required for optimal performance of the fuel cell 12. In these situations expander 18 is bypassed, secondary compressor 34 is activated, and regulators 22, 24 are respectively and accordingly adjusted to provide the desired pressure decreases.

In this manner, system 10 efficiently utilizes the potential energy stored within the compressed hydrogen gas to supply pressurized air to the fuel cell 12 by use of expander 18 and compressor 20. That is, the potential energy is converted into mechanical energy which is used to selectively drive the compressor 20. This conserves energy by eliminating the need to use electricity to supply pressurized air to fuel cell 12 during many operating conditions or modes of vehicle 14, thereby improving the overall fuel economy of the vehicle 14. Energy conversion unit 10 further eliminates the need for a "high-pressure" pressure-reducing regulator, by desirably lowering the pressure of the hydrogen gas by a substantial amount (e.g., by at least a factor of 10) prior to the gas passing through low pressure regulator 22 and into fuel cell 12. System 10 also provides the flexibility to bypass the expander 18 and compressor 20 in certain situations, thereby substantially guaranteeing that the hydrogen gas and air entering fuel cell 12 will be of a sufficient pressure for optimal performance.

It is to be understood that the invention is not to be limited to the exact construction and/or method which has been illustrated and discussed above, but that various changes and/or modifications may be made without departing from the spirit and the scope of the invention.

What is claimed is:

1. A system for supplying air to a fuel cell within a vehicle, said system comprising:
   a fuel tank which stores pressurized gas;
   a first conduit system which selectively and fluidly couples said fuel tank to said fuel cell, effective to allow said pressurized gas to be selectively communicated to said fuel cell;
   an expander which is disposed within said first conduit system and which is selectively and rotatably driven by said pressurized gas, effective to lower the pressure of said gas which is communicated to said fuel cell;
   a second conduit system which selectively and fluidly couples said fuel cell to a source of air, effective to allow said air to be selectively communicated to said fuel cell; and
   a compressor which is disposed within said second conduit system and which is operatively coupled to and rotatably driven by said expander, said compressor being effective to compress said air which is communicated to said fuel cell.

2. The system of claim 1 further comprising a pressure regulator which is operatively disposed within said first conduit system and which controls the pressure of the gas that is communicated to said fuel cell.

3. The system of claim 2 further comprising a bypass valve which is effective to cause said pressurized gas to selectively bypass said expander.

4. The system of claim 3 further comprising:
   at least one sensor that is effective to measure at least one vehicle operating attribute and to generate a signal representing said measured vehicle operating attribute; and
   a controller which is communicatively coupled to said bypass valve and to said at least one sensor, said controller being effective to receive said signal and to selectively actuate said bypass valve based upon the value of said signal, thereby selectively causing said hydrogen gas to bypass said expander.

5. The system of claim 4 further comprising:
   wherein said controller is further communicatively coupled to and selectively controls the operation of said pressure regulator.

6. The system of claim 5 further comprising a second pressure regulator which is operatively disposed within said second conduit system and which controls the pressure of said air which is communicated to said fuel cell.

7. The system of claim 4 further comprising:
   a secondary compressor which is selectively and fluidly coupled to said fuel cell and to said source of air, and which is communicatively connected to said controller;
   wherein said controller is effective to selectively activate said secondary compressor when said bypass valve is activated, effective to provide pressurized air to said fuel cell.

8. A system for supplying pressurized hydrogen gas and air to a fuel cell within a vehicle, said system comprising:
   a fuel tank which stores said pressurized hydrogen gas;
   a first conduit system which selectively and fluidly couples said fuel tank to said fuel cell, effective to allow said pressurized hydrogen gas to be selectively communicated to said fuel cell;

an expander which is disposed within said first conduit system and which is selectively and rotatably driven by said pressurized hydrogen gas, effective to lower the pressure of said hydrogen gas which is communicated to said fuel cell;

a bypass valve which is disposed within said first conduit system and which is effective to cause said pressurized hydrogen gas to selectively bypass said expander;

a second conduit system which selectively and fluidly couples said fuel cell to a source of air, effective to allow said air to be selectively communicated to said fuel cell;

a compressor which is disposed within said second conduit system and which is mechanically coupled to and rotatably driven by said expander, said compressor being effective to compress said air which is communicated to said fuel cell;

a secondary source of pressurized air which is selectively connected to said fuel cell; and a controller which is communicatively connected to said bypass valve and to said secondary source of pressurized air, which selectively actuates said bypass valve, effective to cause said pressurized hydrogen gas to bypass said expander, and which selectively connects said secondary source of pressurized air to said fuel cell when said pressurized hydrogen gas bypasses said expander.

9. The system of claim 8 further comprising:

a plurality of sensors which are effective to measure vehicle operating attributes and to generate signals representing said measured vehicle operating attributes; and wherein said controller is communicatively coupled to said plurality of sensors and is effective to receive said signals and to selectively actuate said bypass valve based upon the value of said signals.

10. The system of claim 9 wherein said plurality of sensors comprises:

a pressure sensor which is effective to measure a pressure of said hydrogen in a certain location in said first conduit system, and to generate a first signal representing said measured pressure value.

11. The system of claim 10 further comprising:

a pressure regulator which is operatively disposed within said first conduit system and which controls the pressure of the hydrogen gas that is communicated to said fuel cell;

wherein said controller is communicatively coupled to said pressure regulator and controls the operation of said pressure regulator based upon said measured pressure value.

12. The system of claim 9 wherein said plurality of sensors comprises a fuel sensor which is adapted to estimate the amount of pressurized hydrogen gas remaining in said fuel tank.

13. The system of claim 9 wherein said expander comprises a turbine.

14. The system of claim 9 wherein said compressor comprises a turbine.

15. A method for delivering pressurized gas and air to a fuel cell, said method comprising the steps of:

storing said pressurized gas within a container;

providing a first conduit system for transferring said pressurized gas from said container to said fuel cell;

providing a second conduit system for transferring air to said fuel cell;

providing an expander;

providing a compressor;

operatively disposing said expander within said first conduit system;

operatively disposing said compressor within said second conduit system;

operatively connecting said expander to said compressor; and channeling said pressurized gas through said expander, effective to rotatably drive said expander and said compressor, thereby reducing the pressure of said gas that is transferred to said fuel cell and increasing the pressure of said air that is transferred to said fuel cell.

16. The method of claim 15 wherein said expander is mechanically linked to said compressor.

17. The method of claim 15 wherein said expander comprises a turbine.

18. The method of claim 15 wherein said compressor comprises a turbine.

19. The method of claim 15 further comprising the steps of:

providing a first pressure regulator;

disposing said first pressure regulator within said first conduit system; and controlling the pressure of said gas that is communicated to said fuel cell by use of said first pressure regulator.

20. The method of claim 15 further comprising the steps of:

providing a secondary source of pressurized air;

selectively causing said pressurized gas to bypass said expander; and coupling said secondary source of pressurized air to said fuel cell when said pressurized gas bypasses said expander.

* * * * *